United States Patent
Huang et al.

(10) Patent No.: US 10,171,588 B2
(45) Date of Patent: Jan. 1, 2019

(54) WEB OPERATION PLAYBACK

(71) Applicant: International Business Machines Corporation, Armonk, NY (US)

(72) Inventors: Wei Huang, Shanghai (CN); He Lan Yao, Shanghai (CN); Pei Wang, Shanghai (CN); Xian Jun Zhu, Shanghai (CN); Xiao Wen Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 14/089,330

(22) Filed: Nov. 25, 2013

(65) Prior Publication Data
US 2014/0157109 A1 Jun. 5, 2014

(30) Foreign Application Priority Data

Nov. 30, 2012 (CN) .......................... 2012 1 0501958

(51) Int. Cl.
*G06F 17/24* (2006.01)
*H04L 29/08* (2006.01)

(52) U.S. Cl.
CPC .............. *H04L 67/14* (2013.01); *H04L 67/02* (2013.01); *H04L 67/22* (2013.01)

(58) Field of Classification Search
CPC combination set(s) only.
See application file for complete search history.

(56) References Cited

U.S. PATENT DOCUMENTS

| 7,231,606 | B2 | 6/2007 | Miller |
| 7,917,755 | B1 * | 3/2011 | Giliyaru .............. G06F 17/2211 382/181 |
| 7,970,857 | B2 | 6/2011 | Schneider |
| 8,145,705 | B1 | 3/2012 | Rust |

(Continued)

FOREIGN PATENT DOCUMENTS

CN 101763357 A 6/2010

OTHER PUBLICATIONS

"A Method for Diagnosing Reasons for Login Playback Failure during an Automated Web Crawl," IP.com Prior Technical Art Disclosure No. IPCOM000218279D, May 31, 2012, 6 pages.

(Continued)

*Primary Examiner* — Stephen Hong
*Assistant Examiner* — Hope C Sheffield
(74) *Attorney, Agent, or Firm* — Yee & Associates, P.C.; Robert J. Shatto

(57) ABSTRACT

Network techniques are provided, including a method and system for the accurate and complete playback of web operations. According to an embodiment, there is provided a method for playing back a web operation including one or more of the following inputs: a document object model (DOM) node event, a web request, and a web response. The method comprises: in response to the execution of the web operation, identifying an act input from inputs of the web operation, the act input including a DOM node event or a web response; recording feature information associated with the identified act input, the feature information including a temporal sequence feature of the act inputs and a self constraint feature of the act input, and the feature information being used for playing back the web operation.

7 Claims, 5 Drawing Sheets

(56) References Cited

U.S. PATENT DOCUMENTS

| | | | |
|---|---|---|---|
| 2004/0139480 A1* | 7/2004 | Delpuch | H04N 7/17318 |
| | | | 725/135 |
| 2008/0005793 A1* | 1/2008 | Wenig | G06F 11/3438 |
| | | | 726/22 |
| 2008/0127097 A1* | 5/2008 | Zhao | G06F 11/3664 |
| | | | 717/124 |
| 2008/0294679 A1 | 11/2008 | Gatterbauer et al. | |
| 2009/0063968 A1* | 3/2009 | Wenig | G06Q 30/02 |
| | | | 715/704 |
| 2011/0022964 A1 | 1/2011 | Toebes et al. | |
| 2011/0055683 A1* | 3/2011 | Jiang | G06F 17/30899 |
| | | | 715/234 |
| 2011/0191676 A1 | 8/2011 | Guttman et al. | |
| 2011/0246879 A1 | 10/2011 | White et al. | |
| 2011/0264787 A1* | 10/2011 | Mickens | G06F 11/3414 |
| | | | 709/224 |
| 2012/0072539 A1 | 3/2012 | Artz, Jr. et al. | |

OTHER PUBLICATIONS

"Method for Distributed Low-Latency Web Conference: Screen Sharing, Recording, and Playback," IP.com Prior Art Technical Disclosure No. IPCOM000219782D, Jul. 12, 2012, 4 pages.

\* cited by examiner

| Order | Action | Pre-requisite | Pre-requisite Delay | Timeout since Previous Action |
|---|---|---|---|---|
| 1 | Response 1 | Request 1 | 200ms | 0ms |
| 2 | Response 2 | Request 2 | 100ms | 200ms |
| 3 | Mouse Down Event | DOM node1 | 0ms | 150ms |
| 4 | Key Up Event | DOM node2 | 0ms | 10ms |
| 5 | Response 3 | Request 3 | 150ms | 500ms |

| Order | Action | Pre-requisite | Pre-requisite Delay | Timeout since Previous Action |
|---|---|---|---|---|
| 1 | Response 1 | Request 1 | 400ms | 0ms |
| 2 | Response 2 | Request 2 | 400ms | 100ms |
| 3 | DOM Event 1 | DOM node1 | 0ms | 150ms |
| 4 | Response 3 | Request 3 | 300ms | 400ms |

WEB OPERATION PLAYBACK

This Application claims the benefit of priority to China Patent Application Serial No. 201210501958.X, filed on Nov. 30, 2012, the contents of which are hereby incorporated by reference.

BACKGROUND

The present invention relates to network techniques, and more specifically, to a method and system for accurately and completely playing back web operations that have been performed.

Currently, a large amount of applications exist as web applications, or require web interactions or information transmissions during the execution thereof. In order to test web applications, debug or modify those applications in accordance with user-reported error information occurred during application execution, it is necessary to play back web operations performed when those errors occurred. Web operations may comprise various types of inputs, for example, clicking a button on a webpage by a user (a DOM node event), submitting a HTTP request by a browser (a web request), or receiving a HTTP response returned by a server (a web response). When playing back web operations, it is required to ensure not only the input integrity of the web operations, but also the temporal sequence of various inputs involved in the web operations, otherwise, the previous web operation procedure cannot be played back accurately.

A particular example will be given below: assume there is a web 2.0 environment, with a table used in a dialog in that environment, in which a pull-down menu and a "submit" button are provided. A common web operation flow may comprise: (1) initiating a dialog by a user to show that table (act 1); (2) providing default values in the pull-down menu of the table, while dynamically retrieving some real-time contents from the server side to replace the original default values (web request 1→web response 1); (3) selecting a value by the user and clicking the "submit" button to submit the table (act 2→request 2→response 2). Thus, a normal operation flow abstracted from the web operations is "act 1→request 1→response 1→act 2→request 2→response 2". During the web operation procedure, if a user clicks the "submit" button of the table without obtaining real-time contents from the server when the table is exactly displayed, the default values will be sent to the server side, and thus causing an error to be reported. A flow corresponding to actual web operations causing the reported error is "act 1→request 1→act 2→request 2→response 1→response 2". In order to detect the reason of the user error, program testers and developers have to play back the same web operations of the user in the same input order, for the reason of the error occurred when the user runs the software is because of the varied input order of those web operations.

There are some technical solutions in the prior art for recording a web operation procedure, which can only record the correspondence between web requests and web responses. However, they can not record the temporal sequence of multiple web responses, and timeout constraints between web requests and web responses. In addition, DOM node events triggered by users can not be logged in the prior art. As a result, the accurate and complete playback of actual web operations cannot be implemented.

SUMMARY

In view of the above problems, one object of invention is to provide a method and system for accurately and completely play back actual web operations, without any change in the present network environments, architectures, or additional network burdens.

According to one embodiment of the present invention, there is provided a method for playing back a web operation including one or more of the following inputs: a DOM node event, a web request, and a web response. The method comprises: in response to the execution of the web operation, identifying an act input from inputs of the web operation, the act input including a DOM node event or a web response; recording feature information associated with the identified act input, the feature information including a temporal sequence feature of the act inputs and a self constraint feature of the act input, and the feature information being used for playing back the web operation.

According to another embodiment of the present invention, there is provided a system for playing back a web operation including one or more of the following inputs: a DOM node event, a web request, and a web response. The system comprises: an identification means configured to in response to the execution of the web operation, identify an act input from inputs of the web operation, the act input including a DOM node event or a web response; and a feature information recording means configured to record feature information associated with the identified act input, the feature information including a temporal sequence feature of the act inputs and a self constraint feature of the act input, and the feature information being used for playing back the web operation.

According to the method and system provided in this invention, through recording related feather information during the actual execution of web operations, web operations that have been taken place previously can be accurately and completely played back later if necessary, without any change in the present network environments, architectures, or additional network burdens.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
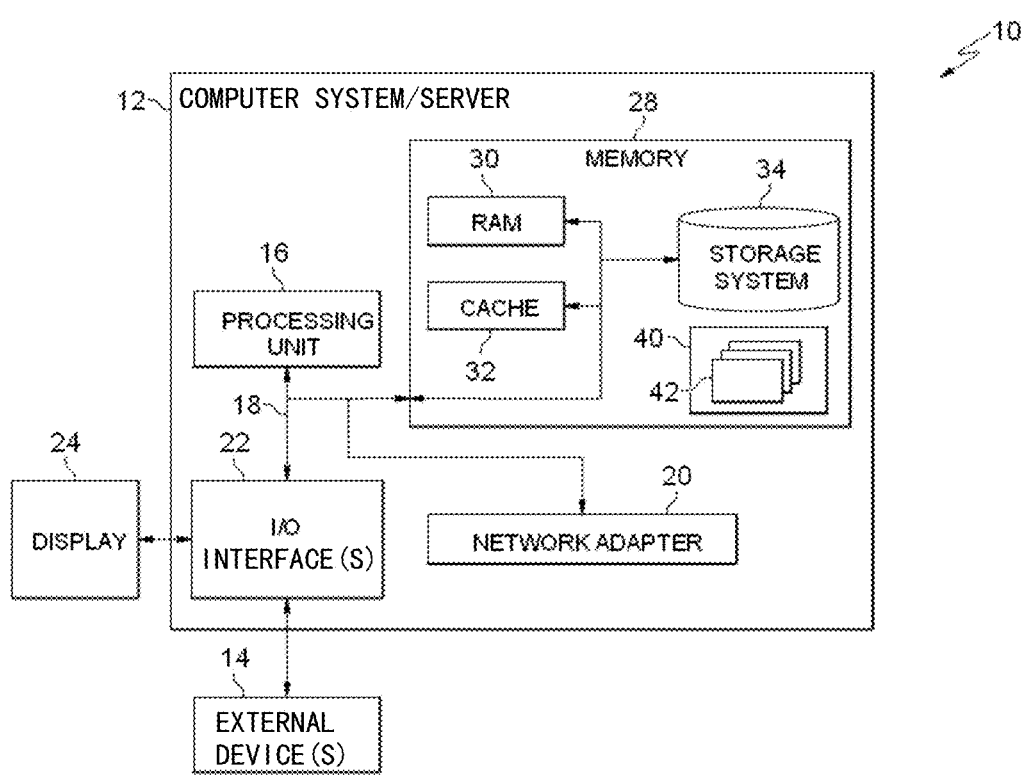
FIG. 1 shows an exemplary computer system 100 which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
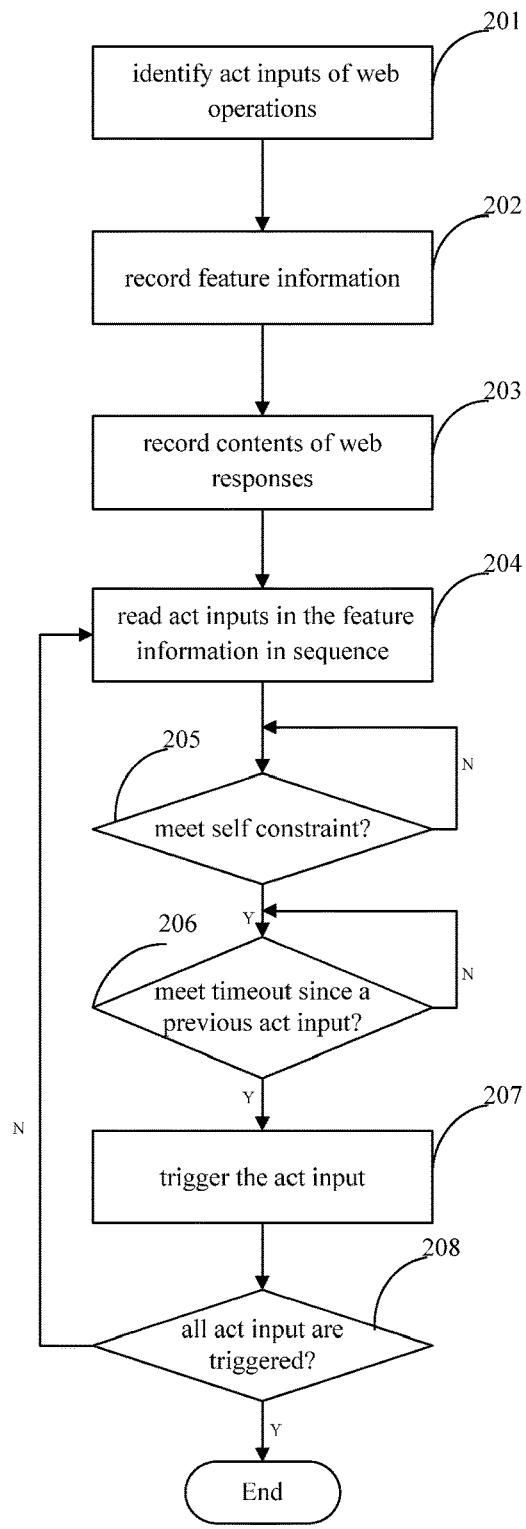
FIG. 2 shows a flowchart of a method for playing back web operations according to an embodiment of this invention.

An introduction of FIG. 2 will be given below. FIG. 2 shows a flowchart of a method for playing back web operations according to an embodiment of this invention. The method starts at step 201, where in response to the execution of web operations, act inputs are identified from inputs of the web operations, wherein the act inputs include DOM node events and web responses.

According to an embodiment of this invention, the web operations comprise one or more of the following inputs: a DOM node event, a web request, a web response. Those skilled in the art should understand that DOM is the acronym of Document Object Model, for parsing a HTML webpage through a DOM tree to produce a tree structure of the HTML webpage. Thus a DOM node event is an event occurred with respect to a node in the HTML webpage's tree structure, for example, a click on a "button" of the HTML webpage pertains to a DOM node event. As for "web request" and "web response", a typical instance is a HTTP request and a corresponding HTTP response. The web response is definitely produced for the purpose of a web request, and there is a correspondence therebetween. Among the several input types of web operation described above, we define "DOM node event" and "web response" as "act input", because only "DOM node event" and "web response" belong to inputs that are externally triggered and produced, wherein a "DOM node event" is triggered by a user act, and a "web response" is triggered by a web request. On the other hand, a "web request" is information that is actively sent out by a browser, and thus does not belong to the "act input" of this invention. Those skilled in the art should understand that how to identify the types of inputs during the process of web operations is common technical means in the art, and will not be described in detail herein.

Next, the method of FIG. 2 proceeds to step 202, where feature information associated with the identified act inputs is recorded, including a temporal sequence feature of those act inputs and constraint features of those act inputs themselves, which are used for the playback of the web operations.

According to an embodiment of this invention, the temporal sequence feature of the act inputs comprises: an occurrence sequence of the various act inputs, and timeout of each act input since its previous act input. According to still another embodiment of this invention, if the act input is a DOM node event, the constraint feature of this act input itself comprises: a DOM node on which the DOM node event depends, and timeout of the DOM node event since the occurrence time of the DOM node it depends on. According to still another embodiment of this invention, if the act input is a web response, the constraint feature of this act input itself comprises: a correspondence between the web response and a web request that triggers the web response, and timeout of the web response since the web request.

Figures 3, 4A:
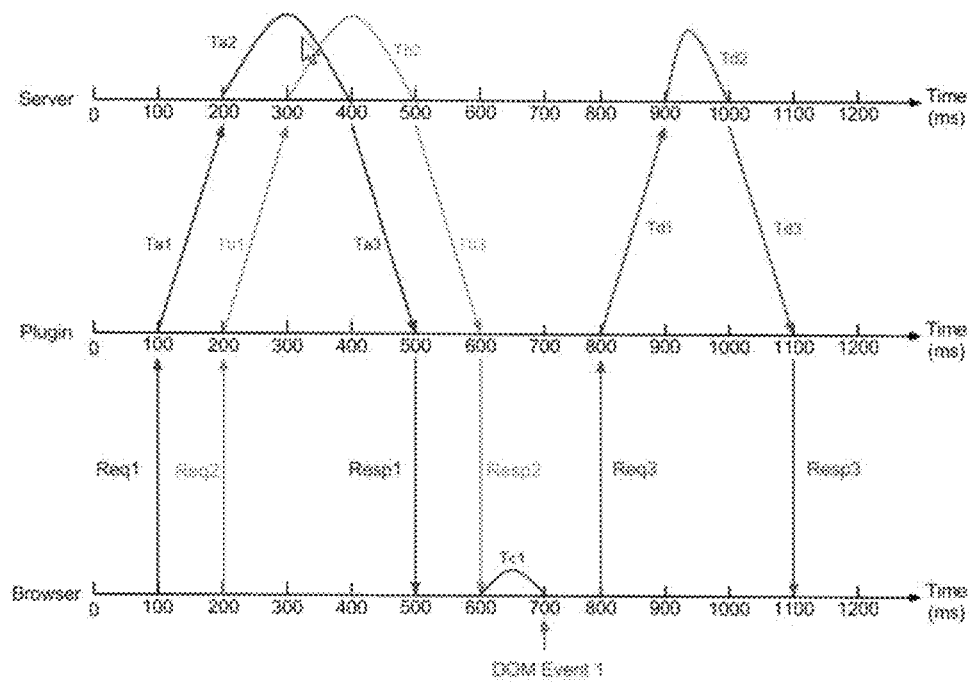
FIG. 3 shows a table for recoding feature information according to an embodiment of this invention.
FIG. 4A shows a schematic timing diagram of web operations according to an embodiment of this invention.

Feature information recorded at step 202 will be interpreted below in connection with FIG. 3. FIG. 3 shows a table of recorded feature information according to an embodiment of this invention. The table of FIG. 3 shows feature information of five act inputs, among a series of web operations, wherein sorted by their occurrence times, web response 1 (Response 1) occurs at the first and web response 3 (Response 3) at the last, each of the third and fourth act inputs (Mouse Down Event and Key Up Event) is a DOM node event (DOM Event). Particularly, taking the first row as an example (the act input of "Response 1"), the third column represents a correspondence between the web response and the web request triggering the web response of the self constraint feature, wherein "Request 1" represents that the occurrence of Request 1 is the prerequisite of the occurrence of Response 1. The fourth column represents timeout between Response 1 and Request 1, "200 ms" represents that Response 1 can only occur at least 200 ms after the occurrence of Request 1. The fifth column of the first row represents timeout between this act input and its previous act input, wherein it has a value "0 ms", because the first row represents the first act input Response 1, which does not have an act input occurred previously. Also, taking the second row shown in FIG. 3 as an example, the second row directs to a second act input "Response 2". The third column of the second row represents that Response 2 is produced in response to a web request "Request 2". The fourth column of the second row, "100 ms", represents that Response 2 can only occur at least 100 ms after the occurrence of Response 2. The fifth column of the second row, "200 ms", represents that Response 2 can only occur at least 200 ms after the occurrence of its previous act input Response 1. Likewise, the meanings of all feature information recorded in the table shown in FIG. 3 can be understood. It should be also noted that as for an act input of the DOM node event type of web operation, in general, it is merely necessary to determine information about the DOM node on which it depends, and the time displacement from the presence of the DOM node to the occurrence of the DOM node event is generally set to 0, of course, not excluding special situations requiring a non-zero value of the time displacement from the presence of the DOM node to the occurrence of the DOM node event.

According to an embodiment of this invention, the temporal sequence feature of act inputs recorded at step 202 is generated by adding a timestamp for each act input among the web operations and then sorting them.

According to another embodiment of this invention, as for an act input which is a web response, the self constraint feature of the act input recorded at step 202 is generated from the correspondence between the URL address of a web request and the web response, and the time displacement is determined as the difference between a timestamp when the web request is sent and a timestamp when the web response is received. Those skilled in the art should understand, as for situations where web requests having the same signature correspond to different web response contents or several web requests having different signatures correspond to the same web response content, existing means in the prior art can be applied to establish a correspondence between the web requests and the web responses (for example, adding sequence numbers in the responses, or omitting some user input values resulting to the web request having different signatures).

According to another embodiment of this invention, as for an act input which is a DOM node event, recoding the self constraint feature at step 202 is implemented through recording DOM node information, event type and the like during the execution of the web operation.

Next, the method shown in FIG. 2 proceeds to step 203, in which the contents of web responses among the identified act inputs are recorded, and the recorded contents are used for the playback of the web operations. The content of a web response refers to the particular information returned by the web response, which for example, includes a HTML file, a JavaScript file, a CSS file and other files, data or information that may be requested by a web request. It is required to record the contents of web responses among the identified act inputs, because web operations can be simulated using the stored contents of the web responses directly when playing back the web operations, without being restricted by network delay resulted from particular network environments. Note that step 203 is not necessary in this invention, so long as the contents of those web responses can be obtained before the actual playback of the web operations, and the contents of those web responses are not necessary to be recorded while recording the feature information. Those skilled in the art should understand that the object of this invention can be implemented, so long as the feature information of the act inputs among the web operations recorded at step 202 can be obtained.

Next, from step 204, the process proceeds to the process of playing back the web operations using the feature information and web response contents recorded at step 202 and 203. At step 204, act inputs involved in the feature information recorded at step 202 are read out in sequence. At step 205, it is determined that whether the self constraint of the act input is satisfied. If the result of the determination is Yes, the process proceeds to step 206 to determine whether the time displacement condition of the act input since its previous act input is satisfied. If the determination result of step 206 is Yes also, the process proceeds to step 207 to trigger the act input, and then at step 208, it is further determined whether all act inputs involved in the feature information have been triggered. If the determination result of step 208 is Yes, it indicates all of the web operation have been played back. If the determination result of step 208 is No, the process returns to step 204 to continuously read out a next act input in sequence, until the determination result of step 208 is Yes.

In brief, web operation playback is to play back every act input among the web operations. For each act input, it can be played back only if both its self constraint condition and time displacement condition since a previous act input are satisfied. The full procedure of recording and playback in the method shown in FIG. 2 can be more clearly understood in connection with FIG. 4A, FIG. 4B, and FIG. 4C.

It should be emphasized that steps 204-208 are not necessary for the realization of the object of this invention, which are given for a better understanding of how to play back web operations using feature information obtained at step 202, and are not necessary to complete the process of web operation playback. Feature information recorded at step 202 are sufficient for accurate and complete web operation playback and are satisfactory for the realization of the object of this invention.

FIG. 4A shows a schematic timing diagram of web operations according to an embodiment of this invention. In FIG. 4A, "Server" represents a server end, "Browser" represents a browser end, "Plugin" represents a plugin interposed between the server end and the browser end, which can be a plugin located in the browser or a separate plugin for realizing the method shown in FIG. 2, provided that there is not a latency of information transmission from the browser to the plugin. It can be seen from FIG. 4A, at a timing of 100 ms, a web request Req1 is sent out from the browser, which is forwarded by the plugin (labeled as Ta1), and then after 100 ms elapse, arrives at the server end at a timing of 200 ms. The sever end takes 200 ms to process the request (from 200 ms to 400 ms), that is, Ta2. At a timing of 400 ms, the server returns a web response Ta3 to the plugin, which reaches the plugin at a timing of 500 ms after 100 ms elapse. Then, the plugin forwards the web response to the browser end, i.e., Resp1, which also reaches the browser at a timing of 500 ms. Other web requests, web responses, DOM node events (a DOM node event at a timing of 600 ms) can be understood in the same manner. In summary, there are four act inputs in the timing sequence of the complete web operation process shown in FIG. 4A (three web responses and a DOM node event).

Figures 4B, 4C:
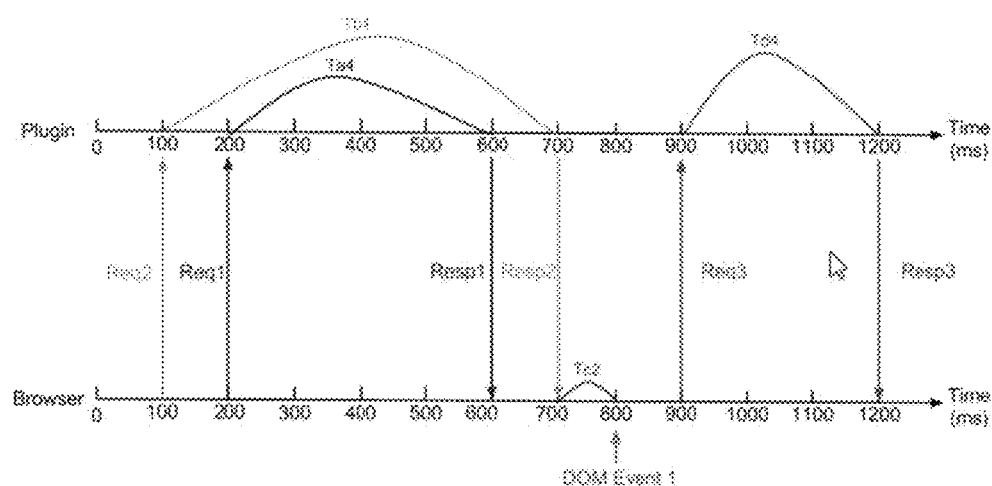
FIG. 4B shows record information obtained through recording the web operations shown in FIG. 4A.
FIG. 4C shows a schematic timing diagram of the resulted playback of the web operations shown in FIG. 4A using the recorded information of FIG. 4B.

Based on FIG. 4A, feature information can be recorded as shown in FIG. 4B. Because the recorded feature information has been explained in detail in connection with FIG. 3 above, the meaning of FIG. 4 will not be described repeatedly herein. Next, web operations of FIG. 4A will be played back using the recorded feature information of FIG. 4B, the result of which is shown in FIG. 4C.

In FIG. 4C, the server end is not shown, because web response and other contents that need to be retrieved from the server have been obtained during the playback process. In FIG. 4C, assume a web request Req2 is sent by a browser at a timing of 100 ms, according to the information of FIG. 4B, the first act input is a web response "Response 1", with a prerequisite that a web request "Request 1" must have been sent out, and the act input lags behind "Request 1" at least 400 ms. Thus, the process of FIG. 4C has to wait after Request 2 is sent out, since the conditions of triggering the first act input are not satisfied. Continuing with FIG. 4C, the web request Request1 is sent out at 200 ms, and it is determined that the two conditions of the first act input are both satisfied until 600 ms, so that Response1 is triggered. According to FIG. 4B, the second act input is Response2, and its trigger conditions that should be satisfied are: (1) a prerequisite web request Request2 that has been sent out, wherein Response2 is triggered at least 400 ms after the sending of Request2; (2) timeout since the previous act input Response1 is at least 100 ms. Hence, it can be seen that the two conditions of the second act input Response2 are both satisfied at 700 ms in FIG. 4C, and thus Response2 is triggered. Similarly, until all of the four act inputs recorded in FIG. 4B are triggered in sequence, the complete playback of the web operations in FIG. 4A is implemented at 1200 ms.

Note that in the playback shown in FIG. 4C, the web request Request2 is sent out prior to the web request Request1, which is inconsistent with the execution process of the web operations shown in FIG. 4A. This is due to the fact that web requests are self-directed acts of the browser, and their sending timings are not controlled in the playback process, so that it is very likely to send an original later web request at first in the playback. Once this happened, according to the manner in the prior art, it is highly possible to cause the web response Response2 to be returned before the web response Response1, leading to disordered act inputs of the web operations, and thus unable to correctly play back the web operations. However, with this invention, the occurrence sequence and the lowest timeout limits of various act inputs can be guaranteed, the lowest timeout limit of each act input since its corresponding prerequisite can be guaranteed also. The timeout condition of Response2 lagging behind Request2 recorded in FIG. 4B is 400 ms, which is the lowest limit (at least 400 ms elapsed), thereby in the playback shown in FIG. 4C, although Response2 is triggered 600 ms after Request2, the constraint condition of FIG. 4B is still satisfied.

Figure 5:
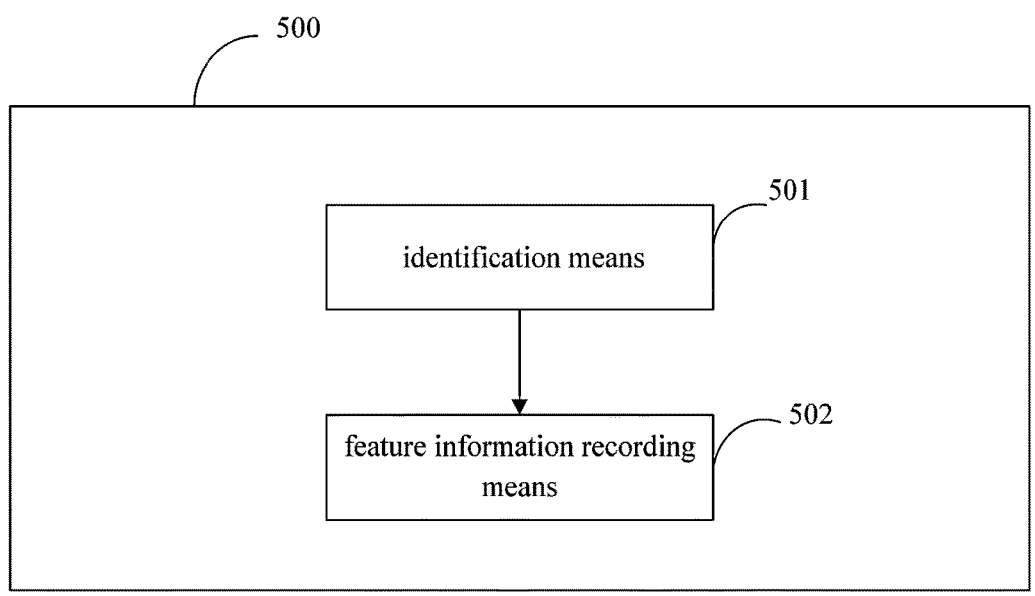
FIG. 5 shows a block diagram of a system for playing back web operations according to an embodiment of this invention.

FIG. 5 shows a block diagram of a system for playing back web operations according to an embodiment of this invention. The system of FIG. 5 is shown as a system 500 in general, particularly comprising an identification means 501 configured to in response to the execution of the web operations, identify act inputs from inputs of the web operations, the act inputs including DOM node events or web responses; and a feature information recording means 502 configured to record feature information associated with the identified act inputs, the feature information including temporal sequence features of the act inputs and self constraint features of the act inputs, the feature information being used for playing back the web operations. Those skilled in the art may understand that means 501-502 of the system 500 correspond to steps 201-202 of the method shown in FIG. 2 respectively, which will not be described in detail herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for playing back a web operation including at least one input selected from a group of inputs consisting of a document object model (DOM) node event, a web request, and a web response, the method comprising:
   in response to execution of the web operation, identifying an act input from the group of inputs of the web operation, wherein the act input includes the DOM node event or the web response;
   recording web response contents and feature information associated with the act input identified, wherein the feature information includes a temporal sequence feature of the act input and a self-constraint feature of the act input by:
      generating a data structure comprising a plurality of temporal sequence features by adding a timestamp to each act input identified among web operations, wherein each entry of the temporal sequence feature in the plurality of temporal sequence features of the act input includes an occurrence sequence of the act input, an action, a prerequisite indicating a prior action upon which the action depends, a prerequisite delay expressed in units of time and timeout of each act input that is a time displacement expressed in units of time determined as a difference between the timestamp of a current act input and a timestamp of a previous respective act input on which the current act input depends;
      sorting the plurality of temporal sequence features into a predetermined sequence according to respective timestamps;
      responsive to the act input being the DOM node event, recording the self-constraint feature of this act input identifying a DOM node on which the DOM node event depends, and a timeout of the DOM node event; and
      responsive to the act input being the web response, recording the self-constraint feature of this act input identifying a correspondence between the web response and a web request that triggers the web response, and a timeout of the web response; and
   playing back, in the predetermined sequence, the web operation recorded using the feature information and the web response contents recorded by:
      determining for a respective entry in an occurrence sequence of act inputs whether a respective self-constraint feature of the act input that identifies the occurrence sequence of act inputs, the action, the prerequisite identifying the prior action upon which the action depends, and the prerequisite delay expressed in units of time is satisfied, wherein the respective self-constraint feature of the act input is satisfied when an elapsed time since occurrence of the prior action meets or exceeds the prerequisite delay;

responsive to determining that the respective self-constraint feature is satisfied, determining whether the timeout expressed in units of time since a previous respective act input on which the current act input depends is satisfied, wherein the timeout since the previous respective act input is satisfied when a second elapsed time since occurrence of the previous respective act input meets or exceeds the timeout; and responsive to determining that the timeout expressed in units of time since the previous respective act input on which the current act input depends is satisfied, triggering the web operation that was recorded.

2. The method according to claim 1, further comprising: recording content of the web response among identified act inputs, wherein the content recorded is used directly in a playback of the web operation, and wherein the content of the web response refers to particular information returned by the web response, in one or more files of a file type including an HTML file, a JavaScript file, and a CSS file, containing data and information requested by the web request.

3. The method according to claim 1, wherein playing back, in the predetermined sequence, the web operation recorded using the feature information and the web response contents recorded comprises:

reading out an act input involved in the feature information in sequence, and determining whether the self-constraint feature of the act input that identifies the occurrence sequence of act inputs, the action, the prerequisite identifying the prior action upon which the action depends, and the prerequisite delay expressed in units of time and the timeout expressed in units of time since a previous respective act input on which the current act input depends are satisfied;

wherein in response to a determination is Yes, triggering the act input and reading out a next act input; and wherein in response to the determination is No, continuing to wait.

4. A computer system for playing back a web operation including at least one input selected from a group of inputs consisting of a document object model (DOM) node event, a web request, and a web response, the computer system comprising:

a bus;

a system memory connected to the bus, wherein the system memory stores program instructions; and a processing unit connected to the bus, wherein the processing unit executes the program instructions to:

identify an act input from the group of inputs of the web operation in response to execution of the web operation, wherein the act input includes the DOM node event or the web response;

record web response contents and feature information associated with the act input identified, wherein the feature information includes a temporal sequence feature of the act input and a self-constraint feature of the act input by:

generating a data structure comprising a plurality of temporal sequence features by adding a timestamp to each act input identified, wherein each entry of the temporal sequence feature in the plurality of temporal sequence features of the act input includes an occurrence sequence of act inputs, an action, a prerequisite indicating a prior action upon which the action depends, a prerequisite delay expressed in units of time and a timeout of each act input, which is a time displacement expressed in units of time determined as a difference between the timestamp of a current act input and a timestamp of a previous respective act input on which the current act input depends;

sorting the plurality of temporal sequence features into a predetermined sequence according to respective timestamps;

responsive to the act input being the DOM node event, recording the self-constraint feature of this act input identifying a DOM node on which the DOM node event depends, and a timeout of the DOM node event; and responsive to the act input being the web response, recording the self-constraint feature of this act input identifying a correspondence between the web response and a web request that triggers the web response, and a timeout of the web response; and play back, in the predetermined sequence, the web operation, recorded using the feature information and the web response contents, by:

determining for a respective entry in an occurrence sequence of act inputs whether a respective self-constraint feature of the act input that identifies the occurrence sequence of act inputs, the action, the prerequisite identifying the prior action upon which the action depends, and the prerequisite delay expressed in units of time is satisfied, wherein the respective self-constraint feature of the act input is satisfied when an elapsed time since occurrence of the prior action meets or exceeds the prerequisite delay;

responsive to determining that the respective self-constraint feature is satisfied, determining whether the timeout since the previous respective act input on which the current act input depends is satisfied, wherein the timeout since the previous respective act input is satisfied when a second elapsed time since occurrence of the previous respective act input meets or exceeds the timeout; and responsive to determining that the timeout expressed in units of time since the previous respective act input on which the current act input depends is satisfied, triggering the web operation that was recorded.

5. The computer system according to claim 4, wherein the processing unit further executes the program instructions to:

record content of the web response among identified act inputs, wherein the content of the web response recorded is used directly in a playback of the web operation, and wherein the content of the web response refers to particular information returned by the web response, in one or more files of a file type including an HTML file, a JavaScript file, and a CSS file, containing data and information requested by the web request.

6. The computer system according to claim 4, wherein the processing unit further executes the program instructions to:

read out an act input associated with the feature information in sequence, and determine whether the self-constraint feature of the act input that identifies the occurrence sequence of act inputs, the action, the prerequisite identifying the prior action upon which the action depends, and the prerequisite delay expressed in units of time and a timeout for the act input expressed in units of time since a previous act input on which the current act input depends are satisfied;

wherein in response to a determination is Yes, triggers the act input and reads out a next act input; and wherein in response to the determination is No, continues to wait.

7. A computer program product comprising a non-transitory computer readable storage medium having program code stored thereon, for execution by a processing unit on a computer, the program code comprising:

program code, responsive to execution of a web operation, for identifying an act input from a group of inputs consisting of a document object model (DOM) node event, a web request, and a web response of the web operation, wherein the act input includes a DOM node event or a web response;

program code for recording web response contents and feature information associated with the act input identified, wherein the feature information includes a temporal sequence feature of the act input and a self-constraint feature of the act input by:

generating a data structure comprising a plurality of temporal sequence features by adding a timestamp to each act input identified, wherein each entry of the temporal sequence feature in the plurality of temporal sequence features of the act input includes an occurrence sequence of act inputs, an action, a prerequisite identifying a prior action upon which the action depends, a prerequisite delay expressed in units of time and a timeout of each act input, which is a time displacement expressed in units of time determined as a difference between the timestamp of a current act input and a timestamp of a previous respective act input on which the current act input depends;

sorting the plurality of temporal sequence features into a predetermined sequence according to respective timestamps;

responsive to the act input being the DOM node event, recording the self-constraint feature of this act input identifying a DOM node on which the DOM node event depends, and a timeout of the DOM node event; and responsive to the act input being the web response, recording the self-constraint feature of this act input identifying a correspondence between the web response and a web request that triggers the web response, and a timeout of the web response; and program code for playing back, in the predetermined sequence, the web operation recorded using the feature information and the web response contents recorded by:

determining for a respective entry in an occurrence sequence of act inputs whether a respective self-constraint feature of the act input that identifies the occurrence sequence of act inputs, the action, the prerequisite identifying the prior action upon which the action depends, and the prerequisite delay expressed in units of time is satisfied, wherein the respective self-constraint feature of the act input is satisfied when an elapsed time since occurrence of the prior action meets or exceeds the prerequisite delay;

responsive to determining that the respective self-constraint feature is satisfied, determining whether the timeout expressed in units of time since a previous respective act input on which the current act input depends is satisfied, wherein the timeout since the previous respective act input is satisfied when a second elapsed time since occurrence of the previous respective act input meets or exceeds the timeout; and responsive to determining that the timeout expressed in units of time since the previous respective act input on which the current act input depends is satisfied, triggering the web operation that was recorded.

* * * * *